United States Patent
Gluck

(10) Patent No.: US 9,900,290 B2
(45) Date of Patent: *Feb. 20, 2018

(54) METHODS AND SYSTEMS FOR PROXYING DATA

(71) Applicant: salesforce.com, inc., San Francisco, CA (US)

(72) Inventor: Yoel Gluck, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,889

(22) Filed: Oct. 10, 2016

(65) Prior Publication Data
US 2017/0034136 A1    Feb. 2, 2017

Related U.S. Application Data

(63) Continuation of application No. 13/592,700, filed on Aug. 23, 2012, now Pat. No. 9,467,424.

(Continued)

(51) Int. Cl.
*H04L 29/06* (2006.01)
*H04L 29/08* (2006.01)
*G06F 17/30* (2006.01)

(52) U.S. Cl.
CPC .... *H04L 63/0428* (2013.01); *G06F 17/30867* (2013.01); *G06F 17/30991* (2013.01); *H04L 63/0281* (2013.01); *H04L 63/0471* (2013.01); *H04L 63/0884* (2013.01); *H04L 63/1416* (2013.01); *H04L 67/28* (2013.01); *H04L 63/126* (2013.01)

(58) Field of Classification Search
CPC ............ H04L 63/0428; H04L 63/1416; H04L 63/0884; H04L 63/0281; H04L 63/0471; H04L 63/126; H04L 67/28; G06F 17/30991; G06F 17/30867
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

OTHER PUBLICATIONS

U.S. Appl. No. 13/592,700—Non Final Office Action dated Apr. 25, 2014, 17 pages.

(Continued)

*Primary Examiner* — Michael Pyzocha
(74) *Attorney, Agent, or Firm* — Haynes Beffel & Wolfeld LLP; Ernest J. Beffel, Jr.

(57) ABSTRACT

Methods and systems are provided for proxying data between an application server and a client device. One exemplary application system includes an application server to generate a virtual application and a proxy server coupled to the application server over a network to provide the virtual application to a client device. The proxy server receives input data from the client device and provides the input data to the application server, wherein the application server encodes the input data for an action in response to authenticating the proxy server and provides the data encoded for the action to the proxy server. The proxy server performs the action on the data and provides the result to the client device.

17 Claims, 5 Drawing Sheets

Related U.S. Application Data

(60) Provisional application No. 61/544,388, filed on Oct. 7, 2011.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,480,850 B1 | 11/2002 | Veldhuisen |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,726,960 B1 | 4/2004 | Sanduja et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,140,044 B2 | 11/2006 | Redlich et al. |
| 7,181,758 B1 | 2/2007 | Chan |
| 7,243,999 B2 | 7/2007 | Lacerda, Jr. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,725,530 B2 | 5/2010 | Sah et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,032,764 B2 | 10/2011 | Shankar et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,347,093 B1 | 1/2013 | Ahmed |
| 8,457,545 B2 | 6/2013 | Chan |
| 8,484,111 B2 | 7/2013 | Frankland et al. |
| 8,490,025 B2 | 7/2013 | Jakobson et al. |
| 8,495,709 B1 * | 7/2013 | Cooper .................. H04L 51/12 713/153 |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 8,826,443 B1 | 9/2014 | Raman et al. |
| 8,856,869 B1 | 10/2014 | Brinskelle |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0112167 A1 | 8/2002 | Boneh et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0028380 A1 | 2/2003 | Freeland et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0131259 A1 | 7/2003 | Barton et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191799 A1 | 10/2003 | Araujo et al. |
| 2003/0204427 A1 | 10/2003 | Gune et al. |
| 2003/0204741 A1 | 10/2003 | Schoen et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |

(56) References Cited

U.S. PATENT DOCUMENTS

| | | |
|---|---|---|
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0183003 A1* | 8/2005 | Peri ............... G06F 17/243 715/226 |
| 2005/0273600 A1* | 12/2005 | Seeman ............ G06F 21/6227 713/160 |
| 2006/0021019 A1 | 1/2006 | Hinton et al. |
| 2006/0036551 A1 | 2/2006 | Oliveira et al. |
| 2006/0062362 A1 | 3/2006 | Davis |
| 2007/0239528 A1 | 10/2007 | Xie et al. |
| 2008/0082662 A1 | 4/2008 | Dandliker et al. |
| 2008/0126794 A1 | 5/2008 | Wang et al. |
| 2008/0147554 A1 | 6/2008 | Stevens et al. |
| 2008/0235508 A1 | 9/2008 | Ran et al. |
| 2008/0249972 A1 | 10/2008 | Dillon |
| 2008/0307529 A1 | 12/2008 | Choi et al. |
| 2009/0013399 A1 | 1/2009 | Cottrell et al. |
| 2009/0063415 A1 | 3/2009 | Chatfield et al. |
| 2009/0100342 A1 | 4/2009 | Jakobson |
| 2009/0113537 A1 | 4/2009 | Woo |
| 2009/0119579 A1 | 5/2009 | Fellenstein et al. |
| 2009/0177744 A1 | 7/2009 | Marlow et al. |
| 2009/0178144 A1 | 7/2009 | Redlich et al. |
| 2009/0326791 A1 | 12/2009 | Horvitz et al. |
| 2010/0031023 A1 | 2/2010 | Dodd |
| 2010/0031299 A1 | 2/2010 | Harrang et al. |
| 2010/0125602 A1 | 5/2010 | Eisinger et al. |
| 2010/0319061 A1 | 12/2010 | Hatakeyama et al. |
| 2010/0332837 A1 | 12/2010 | Osterwalder |
| 2011/0161656 A1 | 6/2011 | Rao |
| 2011/0209196 A1 | 8/2011 | Kennedy |
| 2011/0218958 A1 | 9/2011 | Warshavsky et al. |
| 2011/0238482 A1 | 9/2011 | Carney et al. |
| 2011/0247051 A1 | 10/2011 | Bulumulla et al. |
| 2011/0321148 A1 | 12/2011 | Gluck |
| 2011/0321150 A1 | 12/2011 | Gluck |
| 2011/0321151 A1 | 12/2011 | Gluck |
| 2012/0005720 A1 | 1/2012 | McGloin et al. |
| 2012/0042218 A1 | 2/2012 | Cinarkaya et al. |
| 2012/0233137 A1 | 9/2012 | Jakobson et al. |
| 2012/0246739 A1 | 9/2012 | Mebed |
| 2012/0290407 A1 | 11/2012 | Hubbard et al. |
| 2012/0304265 A1 | 11/2012 | Richter et al. |
| 2012/0324526 A1 | 12/2012 | Meyer et al. |
| 2013/0046995 A1 | 2/2013 | Movshovitz |
| 2013/0067225 A1 | 3/2013 | Shochet et al. |
| 2013/0091210 A1 | 4/2013 | Rajakarunanayake et al. |
| 2013/0173642 A1 | 7/2013 | Oliver |
| 2013/0212497 A1 | 8/2013 | Zelenko et al. |
| 2013/0247216 A1 | 9/2013 | Cinarkaya et al. |
| 2014/0126718 A1 | 5/2014 | Movshovitz |
| 2014/0188804 A1 | 7/2014 | Gokhale et al. |

OTHER PUBLICATIONS

U.S. Appl. No. 13/592,700—Final Office Action dated Dec. 3, 2014, 23 pages.

U.S. Appl. No. 13/592,700—Non Final Office Action dated Aug. 7, 2015, 19 pages.

U.S. Appl. No. 14/266,525, First Action Interview Office Action dated Jan. 21, 2016, 8 pages.

U.S. Appl. No. 13/592,700—Final Office Action dated Jan. 6, 2016, 11 pages.

Do, Jeong-Min et al., "Attribute based Proxy Re-Encryption for Data Confidentiality in Cloud Computing Environments", 2011 First ACIS/JNU International Conference on Computers, Networks, Systems, and Industrial Engineering, pp. 248-251.

Miklau, Gerome et al., "Controlling Access to Published Data Using Cryptography", Proceedings of the 29th VLDB conference, Berlin, Germany, 2003, 12 pages.

U.S. Appl. No. 13/592,700—Notice of Allowance dated Jun. 3, 2016, 9 pages.

\* cited by examiner

METHODS AND SYSTEMS FOR PROXYING DATA

CROSS-REFERENCE TO RELATED APPLICATIONS

This application is a continuation of U.S. application Ser. No. 13/592,700, entitled "Methods and Systems For Proxying Data", filed Aug. 23, 2012, which claims the benefit of U.S. Provisional Patent Application No. 61/544,388, filed Oct. 7, 2011, the entire content of which is incorporated by reference herein.

TECHNICAL FIELD

Embodiments of the subject matter described herein relate generally to computer systems configured to support on-demand applications, and more particularly, embodiments of the subject matter relate to methods and systems for communicating data provided by users or other external systems between an application server and a client via a proxy.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

In practice, multi-tenant systems may service any number of users and/or tenants in any number of jurisdictions. In this regard, an individual jurisdiction may impose legal restrictions on what data is allowed to be transmitted and/or stored outside that jurisdiction or the manner in which that data is to be transmitted and/or stored. For example, a jurisdiction may require certain types of data (e.g., personal identification numbers and/or other personal information) be cryptographically obscured if that data is to be transmitted outside the jurisdiction. However, this data modification may impair the ability of the multi-tenant platform operator to adequately perform security-related operations or other data management functionality that would otherwise be performed on unencrypted data, which, in turn, could create vulnerabilities within the multi-tenant system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
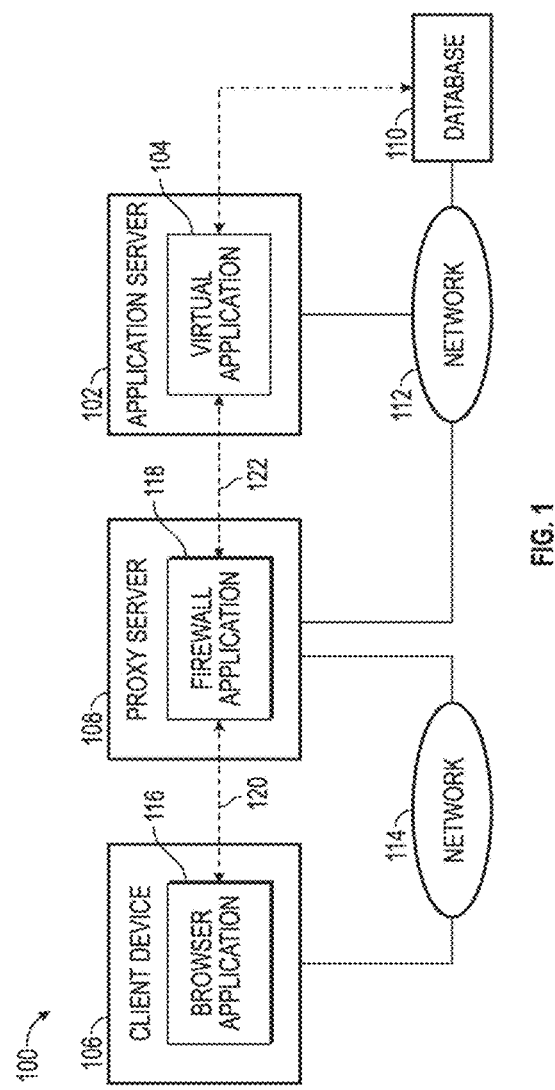
FIG. 1 is a block diagram of an exemplary application system.

Embodiments of the subject matter described herein generally relate to communicating data between an application server and a client device via a proxy. In the exemplary embodiments described herein, the application server and the client device communicate via a proxy server that supports a firewall application that encrypts at least some input data received from the client device. For example, the firewall application may encrypt certain types of data to comply with data residency rules or other restrictions specific to the client device or the jurisdiction where the client device and/or the proxy server resides. As described in greater detail below, authentication protocols are established between the application server and the proxy server so that the application server can authenticate data as being received from a proxy server that performs encryption and securely encode the received data for one or more post-decryption actions in a manner that prevents any potentially malicious code and/or script contained within the input data from interfering with the proxy server and/or the client device performing the post-decryption action(s) on the input data. In one or more embodiments, the application server updates the virtual application provided to the client device in response to the received input data but bypasses performing one or more actions that would otherwise be performed on the request in response to authenticating the request as being received from the proxy server. In this regard, the application server encodes the encrypted data for the bypassed action(s) using an encoding authentication protocol established with the proxy server and provides the encoded encrypted data to the proxy server.

The proxy server decodes the encoded encrypted data in a manner that is influenced by the encoding authentication protocol to recognize or otherwise identify the post-decryption action(s), decrypts the encrypted data, and then performs the post-decryption action(s) on the decrypted data and provides the result to the client device. In this manner, the proxy server performs any actions that were bypassed by the application server on the decrypted data, such as, a security action normally performed by the application server that may not function properly when performed on encrypted (or partially encrypted) data. For example, if the input data includes malicious code and/or script, after encryption, the malicious code and/or script may be obscured from the application server, and as a result, the application server may not be able to detect and disable the malicious code and/or script.

In one or more embodiments, the application server is part of a multi-tenant system and provides instances of the virtual application to multiple different tenants supported by a multi-tenant database coupled to the application server. However, it should be noted that although the subject matter may be described herein in the context of a multi-tenant implementation, the subject matter is not intended to be limited to multi-tenant systems unless clearly indicated by the context.

As used herein, encrypting or variants thereof should be understood as referring to the process of obscuring or otherwise transforming data and/or information using one or more algorithms and/or keys such that the original data and/or information is effectively unreadable to any entity that does not have knowledge of the algorithms and/or keys. Thus, encrypted data is data that has been transformed from its original state to obscure it from third-parties. Conversely, encoding or variants thereof should be understood as referring to the process of coding or otherwise marking data and/or information using an encoding scheme (or markup language) to obtain one or more code segments containing the data and/or information in accordance with the encoding scheme (or markup language), wherein the one or more code segments are readable and/or executable by any entity having knowledge of the encoding scheme (or markup language).

Turning now to FIG. 1, an exemplary on-demand application system 100 includes an application server 102 that dynamically creates and supports a virtual application 104 that is provided to a client device 106 via a proxy server 108. In exemplary embodiments, the application server 102 includes or otherwise implements an application platform that generates the virtual application 104 at run-time (e.g., or "on-demand") based upon data stored or otherwise maintained by a database 110 that is communicatively coupled to the application server. In accordance with one or more embodiments, the database 110 is realized as a multi-tenant database that is shared between multiple tenants, that is, the database 110 may store or otherwise maintain data associated with a number of different tenants, as described in greater detail below in the context of FIG. 5. In this regard, practical embodiments of the application system 100 may include any number of client devices, with the application server 102 providing multiple instances of the virtual application 104 to multiple tenants supported by the database 110. It should be understood that FIG. 1 is merely one simplified representation of the application system 100 provided for purposes of explanation and is not intended to limit the subject matter described herein in any way.

As illustrated in FIG. 1, the application server 102 is communicatively coupled to the proxy server 108 over a first communications network 112, and the proxy server 108 is communicatively coupled to the client device 106 over a second communications network 114. Each of the communications networks 112, 114 may be realized as a wired and/or wireless computer network, a cellular network, a mobile broadband network, a radio network, or the like. In the illustrated embodiment, the first communications network 112 and the second communications network 114 are independent and distinct communications networks. For example, the second communications network 114 may be realized as a private network (e.g., a wired and/or wireless enterprise private network associated with a tenant associated with a user of the client device 106) while the first communications network 112 may be realized as a public computer network (e.g., the Internet). However, in other embodiments, the communications network 112, 114 may be realized using a single communications network (e.g., the Internet or another common public network) accessible to each of the servers 102, 108 and the client device 106 with the client device 106 logically residing behind the proxy server 108 with respect to the application server 102 and/or the virtual application 104.

In the illustrated embodiment of FIG. 1, the application server 102 generally represents a computing system or another combination of other hardware, software, firmware, processing logic, and/or other components configured to implement an application platform that accesses the database 110 and generates or otherwise supports one or more virtual applications 104 provided to one or more client device 106 via the network 112. In this regard, the application server 102 may include a processing system (e.g., a processor, controller, or the like) that includes or otherwise accesses a memory or another non-transitory computer-readable medium of storing programming instructions for execution by the proxy server 108 that, when read and executed by the application server 102, cause the application server 102 to generate an instance of the virtual application 104 that is provided to the client device 106 and perform various additional tasks, operations, functions, and processes described in greater detail below.

The client device 106 generally represents an electronic device that is utilized by a user to access the virtual application 104 and input and/or receive data pertaining to the virtual application 104. In practice, the client device 106 can be realized as any sort of personal computer, mobile telephone, tablet or other network-enabled electronic device. In an exemplary embodiment, the client device 106 includes a display device, such as a monitor, screen, or another conventional electronic display, capable of graphically presenting data and/or information provided by the virtual application 104 (including data retrieved from the database 110) along with a user input device, such as a keyboard, a mouse, a touchscreen, or the like, capable of receiving input data and/or other information from the user of the client device 106, as described in greater detail below.

Still referring to FIG. 1, the proxy server 108 generally represents an intermediary computing system or other combination of other hardware, software, firmware, processing logic, and/or other components configured to generate, execute, or otherwise support a firewall application 118 that proxies, manages, monitors, or otherwise handles communications between the application server 102 and the client device 106 and/or browser application 116. In this regard, the proxy server 108 may include a processing system (e.g., a processor, controller, or the like) that includes or otherwise accesses a memory or another non-transitory computer-readable medium of storing programming instructions for execution by the proxy server 108 that, when read and executed by the proxy server 108, cause the proxy server 108 to generate the firewall application 118 and perform various additional tasks, operations, functions, and processes described in greater detail below.

In exemplary embodiments, the client device 106 and/or the browser application 116 is configured to establish a connection 120 with the proxy server 108 and/or the firewall application 118 over the network 114 to request access to the application server 102 and/or the virtual application 104. In response, the proxy server 108 and/or firewall application 118 establishes the connection 122 with the application server 102 over the network 112 to receive and provide the requested code, data, and or other information pertaining to the virtual application 104 to the browser application 116. It should be appreciated that, in practice, the firewall application 118 may perform various traffic management and/or monitoring, caching, filtering, and other routing operations, such as, for example, transport (e.g., layer 4) and/or network (e.g., layer 3) layer firewall functionality (e.g., IP-based and/or port-based filtering, logic, or the like).

In exemplary embodiments, the firewall application 118 provides application level firewall functionality (e.g., layer 5+), for example, by performing operations on traffic specific to the virtual application 104 based on the logic and/or other information provided by the virtual application 104 and/or the browser application 116, as described in greater detail below in the context of FIGS. 2-4. In this regard, in exemplary embodiments, the firewall application 118 encrypts portions of data received from the browser application 116 that was input by the user of the client device 106 and provides the encrypted user input data to the virtual application 104 along with an indication that the data was (or may be) encrypted by the firewall application 118 and/or the proxy server 108. As described in greater detail below, the virtual application 104 and/or the application server 102 authenticates data as being received from the firewall application 118 and bypasses performing one or more operations and/or functions on the received data in response to authenticating the received data as data that is (or may be) encrypted by the firewall application 118 on the proxy server 108. In this regard, the virtual application 104 and/or the application server 102 handles and/or processes the authenticated data (e.g., by encoding, reformatting, reorganizing, or otherwise manipulating) to update the virtual application 104 based on the logic and/or context of the virtual application 104 and subsequently provides the authenticated data back to the firewall application 118 and/or the proxy server 108 with an indication of one or more post-decryption actions that should be performed by the firewall application 118 and/or the proxy server 108. The firewall application 118 decrypts the encrypted data and performs the post-decryption action(s) on the decrypted data before providing the decrypted data to the client device 106 for execution and/or presentation by the browser application 116. In this regard, the post-decryption action(s) correspond to the actions, operations and/or functions that were bypassed by the virtual application 104 and/or the application server 102 based on the received data being authenticated as being provided by a firewall application 118 and/or proxy server 108 that performs encryption, as described in greater detail below in the context of FIGS. 2-4.

Figure 2:
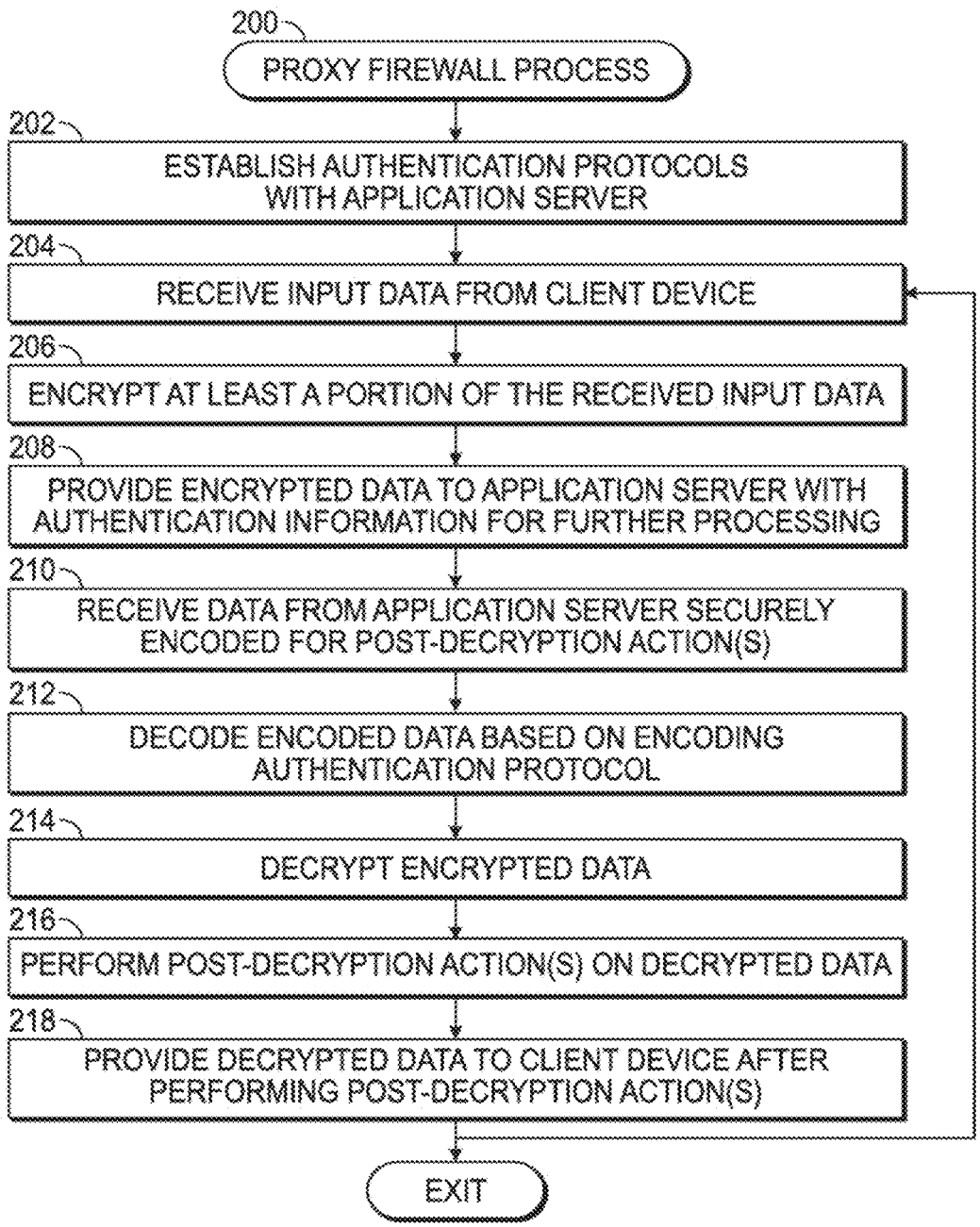
FIG. 2 is a flow diagram of an exemplary proxy firewall process suitable for implementation by the application system of FIG. 1.

FIG. 2 depicts an exemplary embodiment of a proxy firewall process 200 suitable for implementation by an application system, such as application system 100, to communicate between an application server and a client device that is accessing an instance of a virtual application provided by the application server via a firewall application on a proxy server. The various tasks performed in connection with the illustrated process 200 may be performed by software, hardware, firmware, or any combination thereof. For illustrative purposes, the following description may refer to elements mentioned above in connection with FIG. 1. In practice, portions of the proxy firewall process 200 may be performed by different elements of the application system 100. That said, in exemplary embodiments, the proxy firewall process 200 is performed by the proxy server 108 and/or the firewall application 118. It should be appreciated that the proxy firewall process 200 may include any number of additional or alternative tasks, the tasks need not be performed in the illustrated order and/or the tasks may be performed concurrently, and/or the proxy firewall process 200 may be incorporated into a more comprehensive procedure or process having additional functionality not described in detail herein. Moreover, one or more of the tasks shown and described in the context of FIG. 2 could be omitted from a practical embodiment of the proxy firewall process 200 as long as the intended overall functionality remains intact.

Referring to FIG. 2, and with continued reference to FIG. 1, in an exemplary embodiment, the proxy firewall process 200 initializes by establishing authentication protocols with an application server (task 202). In this regard, the proxy server 108 and/or the firewall application 118 establishes a connection 122 with the application server 102 (e.g., in response to a request to access the application server 102 and/or the virtual application 104 from the client device 106 and/or browser application 116) that is utilized to establish a proxy authentication protocol for identifying messages, requests, data and/or other communications received from the proxy server 108 and/or the firewall application 118 as containing encrypted data that may be encoded for post-decryption action(s). In an exemplary embodiment, the application server 102 and/or the virtual application 104 establishes a unique identifier that is associated with the proxy server 108 and/or firewall application 118 and utilized by the virtual application 104 to authenticate or otherwise identify received data as being from the firewall application 118 that is configured to perform encryption on user input data and capable of performing post-decryption actions on data, as described in greater detail below. For example, the application server 102 may determine a unique identifier (e.g., using a random or pseudorandom number generator) that is assigned to the proxy server 108 and/or the firewall application 118 and provide the unique identifier to the firewall application 118, wherein the firewall application 118 appends or otherwise adds the unique identifier to encrypted data that is transmitted to the virtual application 104 on behalf of the browser application 116 and/or the client device 106. In this manner, when the application server 102 and/or virtual application 104 receives messages and/or data that includes this unique identifier, the application server 102 and/or virtual application 104 identifies the received messages and/or data as containing encrypted data provided by the firewall application 118 and/or proxy server 108 associated with that unique identifier. It should be noted that there are numerous potential authentication protocols that may be utilized (either individually or in combination with other authentication protocols) to authenticate data received from the firewall application 118 and/or the proxy server 108 (e.g., using client certificates and/or secure sockets layer (SSL) protocols, passwords, or the like), and the subject matter described herein is not intended to be limited to any particular authentication protocol.

Additionally, in exemplary embodiments, the applications 104, 118 establish a server encoding authentication protocol that is utilized by the firewall application 118 and/or the proxy server 108 to authenticate, identify, or otherwise distinguish the post-decryption action(s) to be performed. In this regard, the server encoding authentication protocol indicates the manner in which the application server 102 and/or virtual application 104 will mark or otherwise sign data communicated to the firewall application 118 and/or the proxy server 108 for post-decryption action(s) by the firewall application 118 and/or the proxy server 108. Thus, the server encoding authentication protocol allows the firewall application 118 and/or the proxy server 108 to recognize, distinguish, or otherwise identify the post-decryption action(s) encoded by the application server 102 and/or virtual application 104 from other data and/or requests received by the firewall application 118 and/or the proxy server 108. For example, in one embodiment, the application server 102 and/or virtual application 104 may utilize its own unique identifier to mark or otherwise sign the encoding for a post-decryption action in a manner that allows the firewall application 118 to distinguish the post-decryption action marked by the server 102 from the remainder of the data that the post-decryption action is intended to be performed on. In this regard, the application server 102 provides its unique identifier to the firewall application 118, which, in turn, utilizes the identifier to recognize the post-decryption action(s) marked by the application server 102 in a manner that allows the firewall application 118 to perform the post-decryption action(s) on the data marked for the post-decryption action(s). In this manner, the browser application 116 may be protected from inadvertently executing code or script that could potentially be injected within the data by a malicious third-party entity attempting to compromise the application domain restrictions on the client device 106 (e.g., cross-site scripting or the like) when the browser application 116 fails to recognize the identifier for the application server 102 within the code or script injected within the data by a malicious third-party entity. In another embodiment, the virtual application 104 may provide the firewall application 118 with a hashing algorithm, a conversion algorithm, cryptographic keys, or some other means for securely obscuring the data that is encoded for post-decryption action(s) by the virtual application 104. In this regard, the virtual application 104 may hash or otherwise convert the data being encoded to a different representation (e.g., from string to hexadecimal) in a manner that prevents potentially malicious code from falsely indicating post-decryption action(s) to be executed by firewall application 118 and/or the proxy server 108, as described in greater detail below. It should be noted that there are numerous potential protocols that may be utilized (either individually or in combination) to mark, sign, or otherwise data in a manner that prevents code within the data from being confused as originating from an authenticated application server, and the subject matter described herein is not intended to be limited to any particular protocol.

In an exemplary embodiment, the proxy firewall process 200 continues by receiving data input by a user of a client device, encrypting at least a portion of the input data, and providing the encrypted data along with authentication information to the application server for further processing (tasks 204, 206, 208). For example, after establishing the authentication protocols, the firewall application 118 provides data, code and/or other information received from the application server 102 that corresponds to the virtual application 104 to the browser application 116 for execution and/or presentation by the client device 106. The data, code and/or other information received from the application server 102 may be executed or otherwise processed by the browser application 116 to present a display corresponding to the virtual application 104. The display corresponding to the virtual application 104 may include data and/or other information associated with the user obtained from the database 110 along with text boxes, data input fields, or other graphical user interface (GUI) elements for receiving data from the user. Subsequently, the user may manipulate a user input device associated with the client device 106 to input or otherwise provide data and/or information to the virtual application 104 for further processing and/or storing in the database 110. Once the data has been input by the user, the browser application 116 transmits the user input data to the firewall application 118 and/or proxy server 108 for transmission to the application server 102.

In exemplary embodiments, the firewall application 118 utilizes one or more cryptographic keys and/or algorithms to encrypt the user input data before transmitting it to the application server 102. In accordance with one or more embodiments, the firewall application 118 performs one or more algorithms to analyze the user input data to determine if any portions of the user input data are to be encrypted. In this regard, the virtual application 104 may provide the firewall application 118 with context information and/or other logic that may be utilized to identify the type(s) of user input data provided by the user, wherein the firewall application 118 determines if any of the types of received user input data should be encrypted, based on, for example, data residency rules, regulations or other restrictions provided for the jurisdiction where the proxy server 108 and/or the client device 106 resides. For example, the proxy server 108 and/or the client device 106 may reside in a jurisdiction where a user's government issued personal identification number (e.g., a Social Security number or the like) cannot be electronically transmitted and/or stored outside the jurisdiction without being encrypted, and the virtual application 104 may identify a particular data input field as corresponding to the government issued personal identification number, wherein the firewall application 118 identifies and encrypts received user input data corresponding to the user's government issued personal identification number. The firewall application 118 continues by adding or otherwise appending the unique identifier or other authentication information corresponding to the firewall application 118 and/or the proxy server 108 to the encrypted user input data before transmitting the encrypted user input data to the application server 102. For example, the firewall application 118 may construct a message that contains the encrypted user input data and has a message header that includes the unique identifier associated with the firewall application 118 and/or proxy server 108.

As described in greater detail below in the context of FIG. 3, the application server 102 and/or the virtual application 104 authenticates the data as being received from the firewall application 118 on the proxy server 108 based on the unique identifier or other authentication information in the message header, for example, by matching a number in the message header to the unique identifier associated with the firewall application 118 and/or the proxy server 108. In response to authenticating the proxy server 108, the application server 102 updates the virtual application 104 based on the received data, stores the authenticated encrypted user input data in the database 110, and/or performs other processing and/or operations on the encrypted user input data without performing one or more actions that would otherwise be performed on the user input data if the data were not authenticated as being from the proxy server 108. For example, for unauthenticated data, the application server 102 and/or virtual application 104 may perform one or more security actions to parse or otherwise analyze the received data to detect and disable potentially malicious code and/or script, wherein the application server 102 and/or the virtual application 104 bypasses analyzing the authenticated user input data for malicious code and/or script. Rather, the application server 102 proceeds by performing various actions to update the virtual application 104 in response to the authenticated encrypted user input data based on the context and/or logic of the virtual application 104. For example, the application server 102 generate code for another web page to be presented on the client device 106 that includes the user input data at a particular location within the web page.

Still referring to FIG. 2, in an exemplary embodiment, after providing encrypted user input data to the application server, the proxy firewall process 200 continues by receiving the encrypted user input data from the application server that has been encoded for one or more post-decryption action(s) based on the server encoding authentication protocol established between the proxy server and the application server (task 210). In this regard, after the application server 102 updates the virtual application 104 in response to the encrypted user input data received from the proxy server 108, the application server 102 encodes the encrypted user input data for one or more post-decryption action(s) based on the server encoding authentication protocol and provides the encoded encrypted user input data to the firewall application 118. For example, the application server 102 may generate code for a web page to be presented on the client device 106 that includes the encrypted user input data within the web page code, wherein the encrypted user input data is encoded or otherwise marked for a particular post-decryption action in a secure manner based on the server encoding authentication protocol established between the proxy server 108 and the application server 102. In one embodiment, the application server 102 encodes the encrypted user input data for the post-decryption action by marking the encoding operators for the post-decryption action with the unique identifier associated with the application server 102. For example, the application server 102 may encode the encrypted user input data ("ENCRYPTED_USER_INPUT") for a post-decryption function ("HTMLESCAPE") by adding the unique identifier associated with the application server 102 ("unique_app_server_id") before and/or after the operators for the post-decryption function (e.g., "unique_app_server_idSTART_HTMLESCAPE ENCRYPTED_USER_INPUT unique_app_server_idEND_HTMLESCAPE"). In another embodiment, the application server 102 hashes the encrypted data or otherwise converts the encrypted data to a different representation, which is provided as a parameter of the post-decryption function. For example, the application server 102 may convert the encrypted user input data ("ENCRYPTED_USER_INPUT") to a hexadecimal representation (e.g., "START_HTMLESCAPE 454e435259505445445f555345525f494e505554 END_HTMLESCAPE").

In exemplary embodiments, the proxy firewall process 200 continues by decoding the encoded data received from the application server based on the server encoding authentication protocol, decrypting the encrypted data, performing the identified post-decryption action(s) on the decrypted data, and providing the result of the post-decryption action to the client device for subsequent execution and/or presentation (tasks 212, 214, 216, 218). In this regard, based on the server encoding authentication protocol, the firewall application 118 and/or proxy server 108 identifies the desired post-decryption action(s) and the data that the post-decryption action(s) is to be performed on. For example, when the application server 102 marks the post-decryption action with a unique identifier or another signature associated with the application server 102, the firewall application 118 parses the encoded data received from the application server 102 to identify or otherwise distinguish between the portion of the received data that corresponds to the encrypted user input data and the encoding for the desired post-decryption action(s). For example, the firewall application 118 may parse the data received from the application server 102 and utilize the unique identifier associated with the application server 102 to identify the operators for the post-decryption action and the portion of the received data between the operators as the encrypted user input data that the post-decryption action is to be performed on. In another embodiment, when the application server 102 obscures the encrypted user input data as the parameter of the post-decryption function, the firewall application 118 identifies the encoding for the post-decryption function, decodes the remainder of the received data based on the server encoding authentication protocol, and identifies the result of the decoding as the encrypted user input data. For example, the firewall application 118 may identify the operators for the desired post-decryption action and decode the portion of the received data between the operators based on the server encoding authentication protocol (e.g., by converting the parameter from hexadecimal representation to a string representation) to obtain the encrypted user input data.

After decoding the encoded encrypted data and identifying or otherwise distinguishing the post-decryption action(s) from the remaining data, the firewall application 118 decrypts the portion of the received data identified as the encrypted data, performs the identified post-decryption action on the decrypted user input data, and then provides the result of the post-decryption action to the browser application 116 for execution and/or presentation by the client device 106. By virtue of the authentication protocols between the servers 102, 108, the identified post-decryption action(s) are performed on any potentially malicious code and/or script contained within the original user input, so that the firewall application 118 can escape, discard, or otherwise prevent the malicious code and/or script from being provided to and/or executed by the client device 106, as described in greater detail below. In exemplary embodiments, the loop defined by tasks 204, 206, 208, 210, 212, 214, 216 and 218 repeats while the virtual application 104 is being provided to the client device 106 during operation of the application system 100 to prevent cross-site scripting or other malicious attacks on the application system 100.

Figure 3:
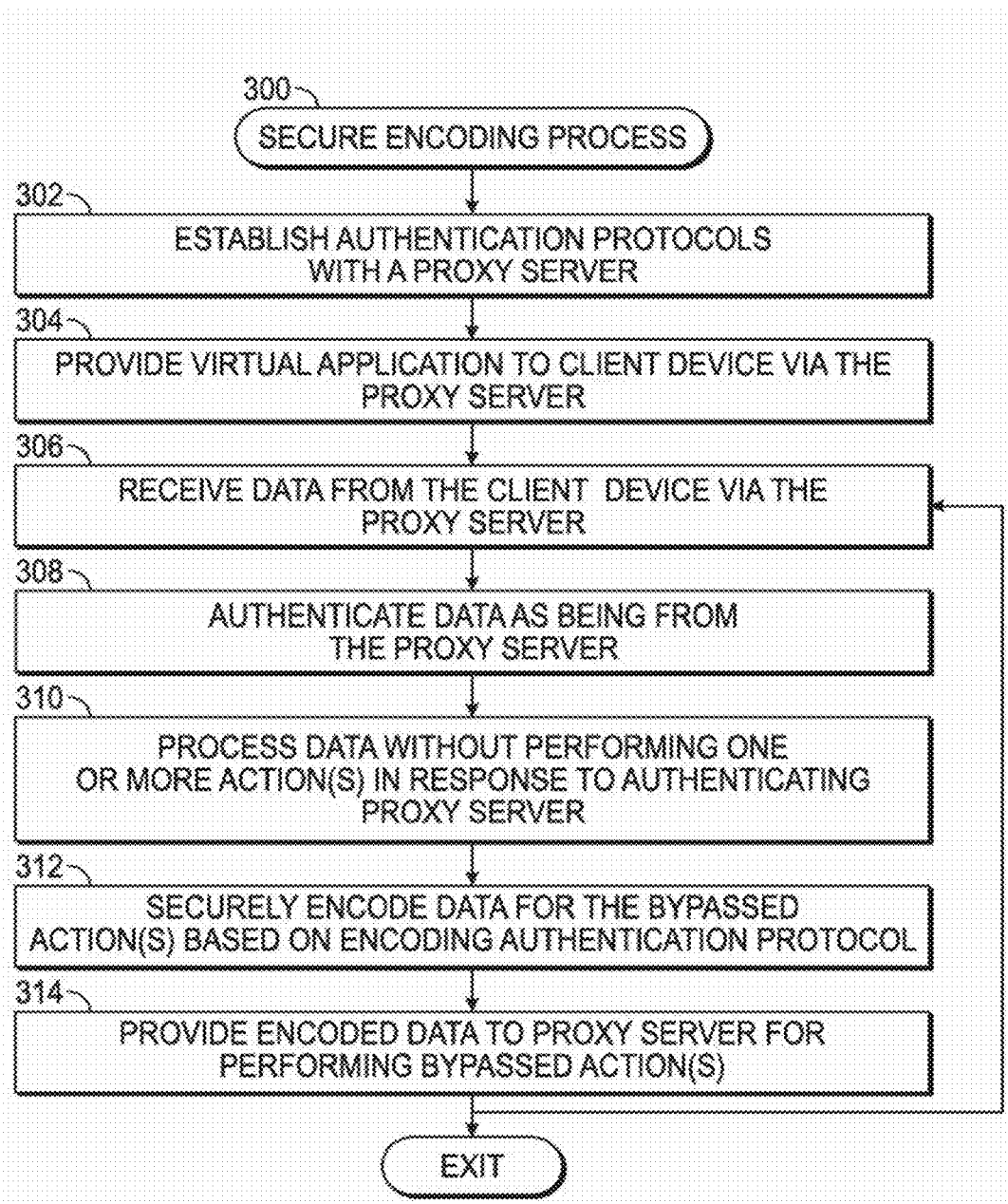
FIG. 3 is a flow diagram of an exemplary secure encoding process suitable for implementation by the application system of FIG. 1.

FIG. 3 depicts an exemplary embodiment of a secure encoding process 300 suitable for implementation by an application system, such as application system 100, to ensure potentially malicious code and/or script is not executed by an application executing on a client device that is accessing an instance of a virtual application via a firewall application on a proxy server. The various tasks performed in connection with the illustrated process 300 may be performed by software, hardware, firmware, or any combination thereof. For illustrative purposes, the following description may refer to elements mentioned above in connection with FIG. 1. In practice, portions of the proxy firewall process 200 may be performed by different elements of the application system 100. That said, in exemplary embodiments, the secure encoding process 300 is performed by the application server 102 and/or the virtual application 104. It should be appreciated that the secure encoding process 300 may include any number of additional or alternative tasks, the tasks need not be performed in the illustrated order and/or the tasks may be performed concurrently, and/or the secure encoding process 300 may be incorporated into a more comprehensive procedure or process having additional functionality not described in detail herein. Moreover, one or more of the tasks shown and described in the context of FIG. 3 could be omitted from a practical embodiment of the secure encoding process 300 as long as the intended overall functionality remains intact.

Referring to FIG. 3, and with continued reference to FIGS. 1-2, in an exemplary embodiment, the secure encoding process 300 initializes by establishing authentication protocols with a firewall application on a proxy server (task 302). As described above, in an exemplary embodiment, the proxy server 108 and/or the firewall application 118 communicates with the application server 102 to establish unique identifiers and/or signatures, encoding schemes, or the like. For example, the application server 102 may generate a unique number (e.g., a random or pseudorandom number using a suitable number generator), associate or otherwise assign that unique number to the proxy server 108 (e.g., by making association between the number and an address of the proxy server 108 on the network 112), and provide the number to the firewall application 118 for association with messages and/or data transmitted by the proxy server 108 to the application server 102 (e.g., by inserting the number in message headers). Similarly, the application server 102 may generate another unique number or some other signature mechanism used to identify encoding performed by the application server 102 and provide that number and/or signature mechanism to the firewall application 118. In this regard, if the application server 102 intends to use a hashing algorithm or some other means for obscuring the encoded encrypted data, the application server 102 indicates or otherwise provides the algorithms, cryptographic keys, and/or other information to the firewall application 118 to enable the firewall application 118 to identify and distinguish between the encoding for the post-decryption action(s) and the encoded data.

After establishing authentication protocols with a firewall application on a proxy server, the secure encoding process 300 continues by generating an instance of a virtual application that is accessed by or otherwise provided to a client device via the proxy server (task 304). As described above, after authenticating the user of the client device 106 and establishing authentication protocols with the firewall application 118 on the proxy server 108, the application server 102 obtains data and/or information from the database 110 that is associated with the request from the user, generates an instance of the virtual application 104 based at least in part on the obtained data, and provides the code, script, data and/or other information pertaining to the instance of the virtual application 104 to the browser application 116 via the firewall application 118 for execution and/or presentation by the client device 106.

In an exemplary embodiment, the secure encoding process 300 continues by receiving user input data from the firewall application on the proxy server, authenticating the received data as being from the firewall application on the proxy server, and further processing the encrypted data without performing one or more action(s) that would otherwise be performed on the encrypted data in response to authenticating the data as being from the firewall application on the proxy server (tasks 306, 308, 310). For example, as described above, the virtual application 104 presented within the browser application 116 may include text boxes, data input fields, or other GUI elements for receiving data from the user, wherein the user manipulates a user input device associated with the client device 106 to input or otherwise provide data and/or information to the virtual application 104 for further processing and/or storing in the database 110. The browser application 116 may encode the user input data based on the logic and/or context of the virtual application 104 and provides the encoded user input data to the firewall application 118, wherein the firewall application 118 performs one or more algorithms using the logic and/or context of the virtual application 104 and one or more cryptography rules (e.g., data residency rules, regulations or other restrictions applicable to the client device 106 and/or the proxy server 108) to analyze the user input data, determine whether any portion of the user input data should be encrypted (e.g., to comply with data residency regulations or other legal restrictions), and encrypt portions of the user input data that should be encrypted. After encrypting the user input data, the firewall application 118 transmits the encrypted user input data to the application server 102 in accordance with the proxy authentication protocol, for example, by constructing a message including a header that includes the unique identifier assigned to the proxy server 108 to identify the message as containing encrypted user input data from the firewall application 118. The application server 102 and/or virtual application 104 receives the message from the firewall application 118 and analyzes the message header to determine whether the message header includes an identifier associated with a proxy server in the application system 100.

When the application server 102 and/or virtual application 104 authenticates the received data and/or message as being from a application 118 on a server 108 that performs encryption, the application server 102 and/or virtual application 104 performs processing on the received data and/or message to update the virtual application 104 in accordance with the logic and/or context of the virtual application 104 while bypassing one or more actions in response to authenticating the data as being from the firewall application 118 on the proxy server 108. For example, the application server 102 and/or virtual application 104 may store the encrypted user input data in the database 110 or manipulate the presentation of the encrypted user input data within the virtual application 104 without performing security actions or other analysis of the content of the received data and/or message that are not intended to be applied to encrypted data. In this manner, the application server 102 may integrate the received input data into the virtual application 104 without decrypting the data or otherwise analyzing the contents of the received input data that is authenticated as being from an encrypting firewall application 118 on a proxy server 108. For example, for unencrypted data, the application server 102 and/or virtual application 104 may parse the data to detect malicious code and/or script that should be escaped to prevent execution by the client device 106 as if the code and/or script were being provided by the virtual application 104 (e.g., cross-site scripting). However, when the encrypted data includes malicious code and/or script, the malicious code and/or script is also encrypted, thereby preventing it from being detected and escaped by the application server 102 and/or virtual application 104. Thus, the application server 102 performs one or more actions to generate updated code, script, data and/or other dynamic web content for the virtual application 104 that integrates or is otherwise influenced by the authenticated encrypted user input data without performing one or more security actions to analyze the contents of the authenticated data.

Still referring to FIG. 3, after processing the encrypted data in the desired manner based on the logic and/or context of the virtual application, the secure encoding process 300 continues by encoding the data for the bypassed action(s) based on the server encoding authentication protocol and providing the encoded encrypted data to the firewall application on the proxy server for performing the bypassed action(s) on the decrypted data (tasks 312, 314). In this regard, the application server 102 and/or the virtual application 104 encodes the authenticated data in a manner that ensures that the bypassed action(s) will be performed by the firewall application 118 and/or the proxy server 108 on the authenticated data. For example, as described above, in one embodiment, the application server 102 and/or virtual application 104 may encode the encrypted data for a bypassed action ("HTMLESCAPE") by adding the unique identifier associated with the application server 102 ("unique_app_server_id") that was established with the firewall application 118 to the encoding operators for the bypassed action (e.g., "unique_app_server_idSTART_HTMLESCAPE ENCRYPTED_USER_INPUT unique_app_server_idEND_HTMLESCAPE"). In another embodiment, the application server 102 and/or virtual application 104 may convert the encrypted data to a different representation or otherwise obscure the encrypted data in a manner established with the firewall application 118 before encoding the converted encrypted data as a parameter of the bypassed action. Again, there are numerous potential means for securely encoding the authenticated data from the firewall application 118 and/or proxy server 108 for post-decryption action(s) to be performed by the firewall application 118 and/or the proxy server 108, and the subject matter described herein is not intended to be limited to any particular protocol. In this regard, in some embodiments, the application server 102 may uniquely sign the encoding for the post-decryption action while also converting the authenticated data to a different representation.

After the application server 102 and/or virtual application 104 securely encodes the authenticated data previously received from the firewall application 118 and/or proxy server 108, the application server 102 and/or virtual application 104 transmits the encoded encrypted data to the proxy server 108 for subsequent processing by the firewall application 118. As described above, in addition to other data traffic management actions that may be performed by the firewall application 118, the firewall application 118 identifies the encrypted data and the desired post-decryption action(s) based on the server encoding authentication protocol established with the application server 102, decrypts the encrypted data, and performs the desired post-decryption action(s) on the decrypted data before providing the data to the client device 106 for execution and/or presentation by the browser application 116. In this manner, if the encrypted user input data includes malicious code and/or script, the firewall application 118 performs action(s) on the decrypted user input data indicated by the application server 102 and/or virtual application 104 to detect or otherwise identify the malicious code and/or script and perform one or more remedial actions (e.g., escaping the decrypted data) to prevent execution of the malicious code and/or script by the client device 106.

Figure 4:
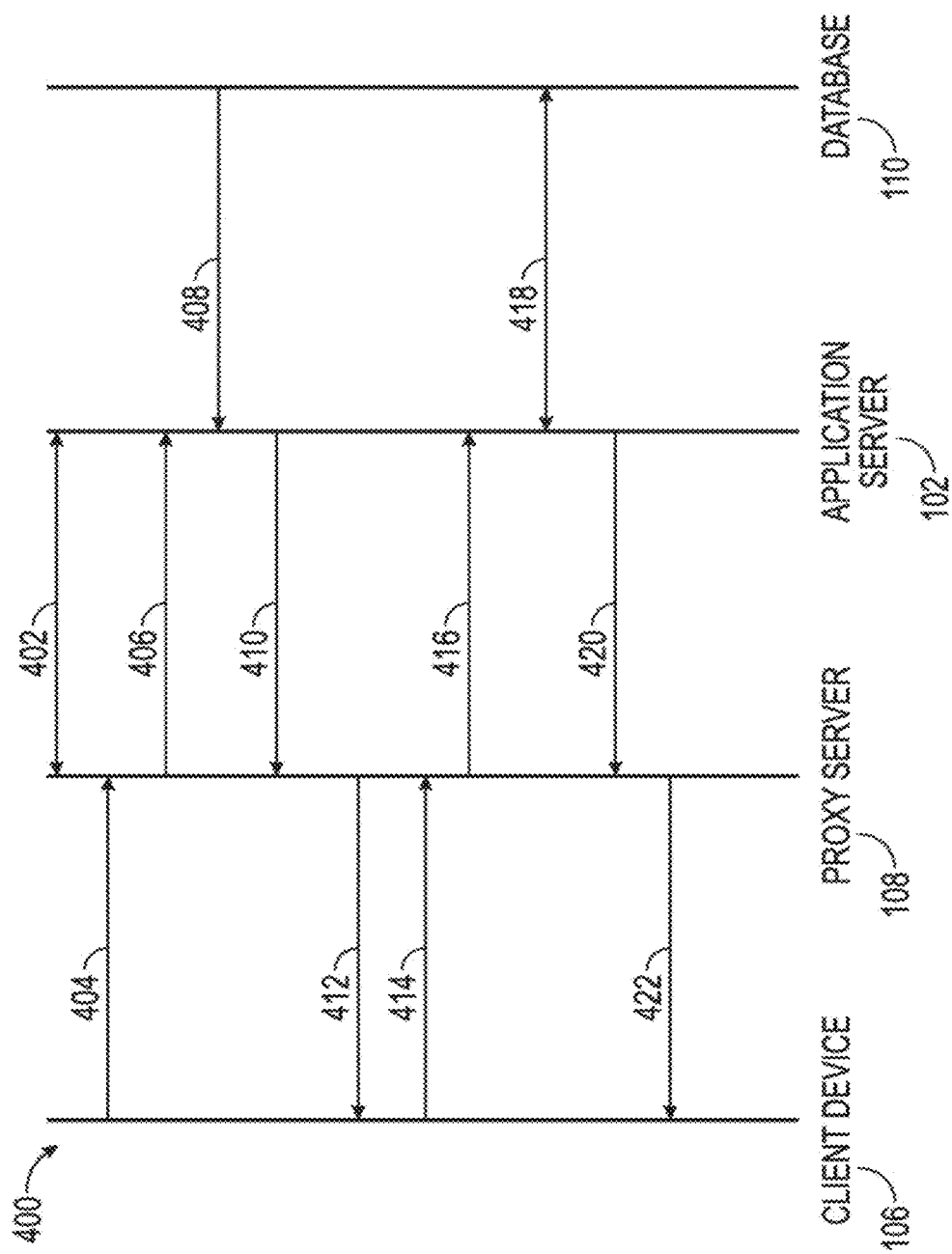
FIG. 4 is a diagram illustrating communications within the application system of FIG. 1 in accordance with one exemplary embodiment of the proxy firewall process of FIG. 2 in conjunction with the secure encoding process of FIG. 3.

FIG. 4 illustrates an exemplary sequence 400 of communications within the application system 100 in accordance with an exemplary embodiment of the proxy firewall process 200 of FIG. 2 in conjunction with the secure encoding process 300 of FIG. 3. Referring to FIG. 4, and with continued reference to FIGS. 1-3, the illustrated sequence 400 begins with the proxy server 108 communicating 402 with the application server 102 via network 112 to establish authentication protocols for subsequent communications between the servers 102, 108. As described above, the application server 102 establishes a proxy authentication protocol for authenticating communications as being from a firewall application 118 on the proxy server 108, such as, for example, by assigning a unique identifier to the proxy server 108 and associating that identifier with the address of the proxy server 108 on the network 112. Additionally, the servers 102, 108 establish a server encoding authentication protocol for encoding data communicated from the application server 102 to the proxy server 108 in a manner that ensures the proxy server 108 and/or firewall application 118 distinguishes encoding for post-decryption action(s) by the application server 102 from code and/or script that is not generated by the application server 102. For example, as described above, in one embodiment, the application server 102 provides the firewall application 118 on the proxy server 108 with a unique identifier or signature that the application server 102 will utilize when encoding data so that the firewall application 118 may utilize that identifier or signature to identify or otherwise distinguish operators of code and/or script generated by the application server 102 from potentially malicious code and/or script generated by a third party. In another embodiment, the application server 102 provides the firewall application 118 on the proxy server 108 with conversion and/or hashing algorithms (including any keys or the like) that the application server 102 will utilize when encoding data to obscure any potentially malicious code and/or script generated by a third-party, so that the firewall application 118 may utilize the conversion and/or hashing algorithms to decode the data obscured by the application server 102.

In an exemplary embodiment, after the servers 102, 108 establish the authentication protocols to be used during subsequent operation of the application system 100, a user of the client device 106 manipulates the browser application 116 to communicate, to the proxy server 108, a request 404 to access the application server 102. In an exemplary embodiment, the request transmitted by the client device 106 includes user information (e.g., a user name, a password, and the like) associated with the user of the client device 106 that is utilized by the application server 102 to authenticate the user before providing data and/or services to the user. In response to the request from the client device 106, the firewall application 118 on the proxy server 108 provides 406 the user information to the application server 102, wherein the application server 102 authenticates the user based on the user information, obtains 408 data from the database 110 that is associated with the user (or the user's tenant) or other data corresponding to the request, and generates an instance of a virtual application 104 based at least in part on the data obtained from the database 110. As described above, the virtual application 104 is provided to the user of the client device 106 via the proxy server 108 by the application server 102 transmitting 410 code, data and/or other dynamic web content to the proxy server 108, which, in turn, is transmitted 412 by the proxy server 108 to the client device 106 and executed by the browser application 116 on the client device 106 to present GUI elements, data, and/or other information pertaining to the virtual application 104 on the client device 106 within the browser application 116.

As described above, the user of the client device 106 manipulates a user input device to input or otherwise provide data and/or information to the virtual application 104 for further processing and/or storing in the database 110. After the user finishes providing the input data, the browser application 116 encodes the user input data based on the logic and/or context of the virtual application 104 and transmits 414 the user input data to the firewall application 118, which performs one or more algorithms using the logic and/or context of the virtual application 104 and one or more data residency rules to identify portions of the user input data that should be encrypted. The firewall application 118 encrypts those portions of the user input data and transmits 416 the encrypted user input data to the application server 102 by constructing a message containing the encrypted user input data and a header that includes the unique identifier or other authentication information assigned to the proxy server 108. The application server 102 receives the message from the firewall application 118, analyzes the message header, and after authenticating the data as encrypted user input data received from the firewall application 118 on the proxy server 108, the application server 102 stores, manipulates, or otherwise processes 418 the encrypted user input data based on the logic and/or context of the virtual application 104 by performing one or more actions to update the virtual application 104 in response to the authenticated input data while bypassing one or more actions that would otherwise be performed on the encrypted user input data if it were not authenticated as being from the proxy server 108. For example, the server 102 may store the received user input data in the database 110 and/or obtain additional data from the database 110 to generate updated web content incorporating the authenticated user input data for subsequent display on the client device 106.

After performing one or more actions on the authenticated user input data, the application server 102 encodes the authenticated user input data for the bypassed action(s) before transmitting 420 the encoded encrypted user input data to the proxy server 108. As described above, in one embodiment, the application server 102 uses a unique identifier or other signature mechanism to encode the data in a manner that allows the firewall application 118 to identify or otherwise distinguish code and/or script generated by the application server 102 from potentially malicious code and/or script generated by a third party, for example, by adding the unique identifier associated with the application server 102 ("uniqueid") before the encoding operators for the bypassed action (e.g., "uniqueidSTART_HTMLESCAPE ENCRYPTED_USER_INPUT uniqueidEND_HTMLESCAPE"). In another embodiment, the application server 102 performs a conversion algorithm to convert the authenticated user input data to a different representation before encoding the authenticated encrypted user input data for the bypassed action, such as, for example, a string to hexadecimal conversion algorithm (e.g., "START_HTMLESCAPE 454e435259505445445f555345525f494e505554 END_HTMLESCAPE").

As described above, the firewall application 118 on the proxy server 108 receives the encoded encrypted data from the application server 102, decodes the encoded encrypted data based on the server encoding authentication protocol to identify the encrypted data and the desired post-decryption action(s), decrypts the encrypted data, then performs the identified post-decryption action(s) on the decrypted data. In this regard, if the decrypted data includes potentially malicious code and/or script that has been encrypted, the firewall application 118 performs the action(s) bypassed by the server 102 after decryption to detect the code and/or script and prevent the code and/or script from being subsequently executed by the client device 106. For example, if the bypassed action is an escape HTML function, the firewall application 118 parses the decrypted data for any HTML code and/or script and escapes the data rather than providing the decrypted data to the client device 106. When the firewall application 118 finishes performing the post-decryption action(s) on the decrypted data, the firewall application 118 transmits 422 the result to the client device 106 for execution and/or display by the browser application 116.

Figure 5:
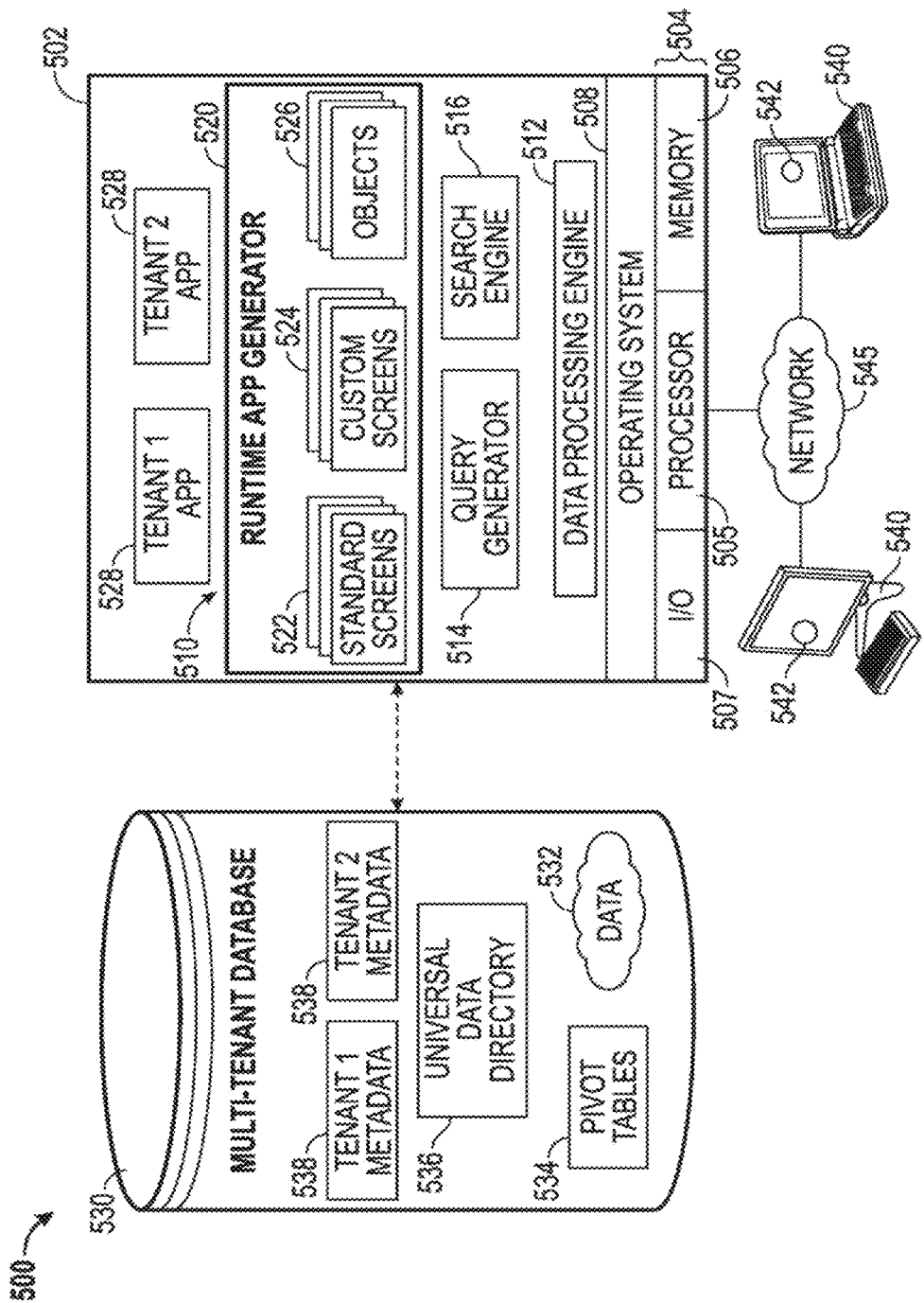
FIG. 5 is a block diagram of an exemplary multi-tenant system suitable for inclusion in the application system of FIG. 1 in accordance with one or more embodiments.

Referring now to FIG. 5, in accordance with one or more embodiments, the database 110 is realized as a multi-tenant database that stores or otherwise maintains data associated with a plurality of tenants, and the application server 102 provides instances of the virtual application 104 to users of multiple different tenants, as described in greater detail below. In this regard, it should be noted that while one or more tenants supported by the application system 100 may utilize a proxy server 108 and/or firewall application 118 that encrypts data to comply with data residency requirements for their jurisdiction, other tenants supported by the application system 100 may access the application server 102 without the proxy server 108 and/or firewall application 118 as an intermediary. Accordingly, for these tenants, the application server 102 may perform security actions (e.g., an escape HTML function, or the like) on non-encrypted input data received from their users that would otherwise be bypassed and performed by the proxy server 108 and/or firewall application 118 on encrypted input data received from users accessing the application server 102 from behind the proxy server 108 and/or firewall application 118.

The illustrated multi-tenant system 500 of FIG. 5 includes a server 502 (e.g., application server 102) that dynamically creates and supports virtual applications 528 (e.g., virtual application 104) based upon data 532 from a common database 530 (e.g., database 110) that is shared between multiple tenants, alternatively referred to herein as a multi-tenant database. Data and services generated by the virtual applications 528 are provided via a network 545 (e.g., network 112 and/or network 114) to any number of client devices 540 (e.g., client device 106), as desired. Each virtual application 528 is suitably generated at run-time (or on-demand) using a common application platform 510 that securely provides access to the data 532 in the database 530 for each of the various tenants subscribing to the multi-tenant system 500. In accordance with one non-limiting example, the multi-tenant system 500 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. To put it another way, each respective user within the multi-tenant system 500 is associated with, assigned to, or otherwise belongs to a particular tenant of the plurality of tenants supported by the multi-tenant system 500. Tenants may represent customers, customer departments, business or legal organizations, and/or any other entities that maintain data for particular sets of users within the multi-tenant system 500. Although multiple tenants may share access to the server 502 and the database 530, the particular data and services provided from the server 502 to each tenant can be securely isolated from those provided to other tenants. The multi-tenant architecture therefore allows different sets of users to share functionality and hardware resources without necessarily sharing any of the data 532 belonging to or otherwise associated with other tenants.

The multi-tenant database 530 is any sort of repository or other data storage system capable of storing and managing the data 532 associated with any number of tenants. The database 530 may be implemented using any type of conventional database server hardware. In various embodiments, the database 530 shares processing hardware 504 with the server 502. In other embodiments, the database 530 is implemented using separate physical and/or virtual database server hardware that communicates with the server 502 to perform the various functions described herein. In an exemplary embodiment, the database 530 includes a database management system or other equivalent software capable of determining an optimal query plan for retrieving and providing a particular subset of the data 532 to an instance of virtual application 528 in response to a query initiated or otherwise provided by a virtual application 528. The multi-tenant database 530 may alternatively be referred to herein as an on-demand database, in that the multi-tenant database 530 provides (or is available to provide) data at run-time to on-demand virtual applications 528 generated by the application platform 510.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 is implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to create, generate, or otherwise facilitate the application platform 510 and/or virtual applications 528 and perform one or more additional tasks, operations, functions, and/or processes described herein. It should be noted that the memory 506 represents one suitable implementation of such computer-readable media, and alternatively or additionally, the server 502 could receive and cooperate with external computer-readable media that is realized as a portable or mobile component or platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 508. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multi-tenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user and/or tenant that initiated the request. In this manner, the query generator 514 suitably obtains requested subsets of data 532 accessible to a user and/or tenant from the database 530 as needed to populate the tables, reports or other features of the particular virtual application 528 for that user and/or tenant.

Still referring to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In exemplary embodiments, the application platform 510 is utilized to create and/or generate data-driven virtual applications 528 for the tenants that they support. Such virtual applications 528 may make use of interface features such as custom (or tenant-specific) screens 524, standard (or universal) screens 522 or the like. Any number of custom and/or standard objects 526 may also be available for integration into tenant-developed virtual applications 528. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 532 associated with each virtual application 528 is provided to the database 530, as appropriate, and stored until it is requested or is otherwise needed, along with the metadata 538 that describes the particular features (e.g., reports, tables, functions, objects, fields, formulas, code, etc.) of that particular virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

Still referring to FIG. 5, the data and services provided by the server 502 can be retrieved using any sort of personal computer, mobile telephone, tablet or other network-enabled client device 540 on the network 545. In an exemplary embodiment, the client device 540 includes a display device, such as a monitor, screen, or another conventional electronic display capable of graphically presenting data and/or information retrieved from the multi-tenant database 530. Typically, the user operates a conventional browser application or other client program 542 executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired.

To briefly summarize, the subject matter described herein facilitates communicating data with an application server using a proxy in a manner that prevents malicious code and/or script from being executed on a client device as if the code and/or script were provided by the application server (e.g., cross-site scripting). For example, if the user input data includes encoding operators along with malicious code and/or script designed to circumvent security actions (e.g., "END_ESCAPEHTML ATTACKCODE"), the application server encodes the user input data in a manner that ensures the proxy performs post-decryption actions to prevent those encoding operators and malicious code and/or script from being executed by the proxy and/or a client device, for example, by signing the operators for the post-decryption action (e.g., "uniqueidSTART_HTMLESCAPE END_ESCAPEHTML ATTACKCODE uniqueidEND_HTMLESCAPE") or converting the user input data to a different representation (e.g., "START_HTMLESCAPE 454e445f45534341504548544d4c2041545441434b434f4 445 END_HTMLESCAPE"). In this manner, for authenticated data from a proxy, any security actions that would normally be performed by the application server are bypassed and performed by the proxy after decryption to prevent cross-site scripting or other malicious attacks.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, firewalls, proxying, on-demand and/or multi-tenant systems or databases, encryption, authentication, encoding, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of storing data with an application server that preserves privacy of one or more data fields, the method including:

receiving, at a privacy proxy server, data representing a user input with first fields to be stored with an application server and at least one second field determined by the privacy proxy server to be encrypted based upon a rule indicating a type of data to encrypt and then stored by the application server;

forwarding the first fields, the second field encrypted, and a second field mark that indicates encryption of the second field to the application server to store;

the privacy proxy server querying the application server for a report that includes the second field encrypted and at least one of the first fields that has not been encrypted;

receiving from the application server the report comprising the at least one of the first fields in a report format and the second field encrypted with a report format placeholder;

distinguishing the second field in the report as having been stored by the application server based on an encoding authentication protocol established between the privacy proxy server and the application server; wherein the report is marked with identification information that uniquely identifies the application server as storing at least the second field;

decrypting the second field and replacing the report format placeholder with the second field decrypted; and causing display of the report with at least the second field decrypted;

and wherein the privacy proxy server determines whether the application server resides outside a jurisdiction of the privacy proxy server.

2. The method of claim 1, wherein decrypting the second field and replacing the report format placeholder includes the privacy proxy server detecting malicious code and performing a remedial action thereby preventing execution of the malicious code by a client.

3. The method of claim 1, wherein the report format placeholder identifies one or more post-decryption actions bypassed by the application server.

4. The method of claim 3, wherein the privacy proxy server performs the post-decryption actions on the second field decrypted.

5. The method of claim 1, wherein decrypting the second field and replacing the report format placeholder further includes distinguishing a unique identifier associated with the application server and utilizing the unique identifier to identify operators of code generated by the application server from potentially malicious code.

6. The method of claim 1, wherein encrypting the second field with the report format placeholder further includes marking the report format placeholder with a unique identifier associated with the application server.

7. The method of claim 1, wherein decrypting the second field and replacing the report format placeholder further includes distinguishing the second field from the report format placeholder based on the encoding authentication protocol established between the privacy proxy server and the application server.

8. A non-transitory, computer-readable medium storing computer executable instructions configured to cause a processor to perform operations including:

receiving, at a privacy proxy server, data representing a user input with first fields to be stored with an application server and at least one second field determined by the privacy proxy server to be encrypted based upon a rule indicating a type of data to encrypt and then stored by the application server;

forwarding the first fields, the second field encrypted, and a second field mark that indicates encryption of the second field to the application server to store;

querying the application server for a report that includes the second field encrypted and at least one of the first fields that has not been encrypted;

receiving from the application server the report comprising the at least one of the first fields in a report format and the second field encrypted with a report format placeholder;

distinguishing the second field in the report as having been stored by the application server based on an encoding authentication protocol established between the privacy proxy server and the application server; wherein the report is marked with identification information that uniquely identifies the application server as storing at least the second field;

decrypting the second field and replacing the report format placeholder with the second field decrypted; and causing display of the report with at least the second field decrypted;

and wherein the privacy proxy server determines whether the application server resides outside a jurisdiction of the privacy proxy server.

9. The computer-readable medium of claim 8, wherein decrypting the second field and replacing the report format placeholder includes the privacy proxy server detecting malicious code and performing a remedial action thereby preventing execution of the malicious code by a client.

10. The computer-readable medium of claim 8, wherein decrypting the second field and replacing the report format placeholder further includes distinguishing a unique identifier associated with the application server and utilizing the unique identifier to identify operators of code generated by the application server from potentially malicious code.

11. The computer-readable medium of claim 8, wherein encrypting the second field with the report format placeholder further includes marking the report format placeholder with a unique identifier associated with the application server.

12. The computer-readable medium of claim 8, wherein decrypting the second field and replacing the report format placeholder further includes distinguishing the second field from the report format placeholder based on the encoding authentication protocol established between the privacy proxy server and the application server.

13. A method of processing data stored with an application server that preserves privacy of one or more data fields, the method including:

receiving, from a privacy proxy server, data representing a user input with first fields and at least one encrypted second field to be stored at an application server, wherein the data includes a second field mark that indicates, to the application server, encryption of the encrypted second field;

storing, at the application server, the first fields and the at least one encrypted second field by the privacy proxy server based on a rule indicating a type of data to encrypt appropriate to an organization;

receiving, from the privacy proxy server, a query for a report that includes the encrypted second field and at least one of the first fields that has not been encrypted;

retrieving the at least one of the first fields and the encrypted second field responsive to the query;

using the application server to format the at least one of the first fields in a report format and to format the encrypted second field with a report format placeholder and to mark the report with identification information that uniquely identifies the application server as storing at least the encrypted second field; and forwarding the report for further computer-implemented processing.

14. The method of claim 13, wherein the report format placeholder identifies one or more post-decryption actions bypassed by the application server.

15. The method of claim 14, further including using the application server to generate code for a web page of a browser application running on a client device, wherein:

the code includes the encrypted second field within the web page; and the encrypted second field is marked with at least one post-decryption action bypassed by the application server.

16. The method of claim 13, wherein using the application server to format the encrypted second field with the report format placeholder further includes marking the report format placeholder with a unique identifier associated with the application server.

17. The method of claim 13, wherein using the application server to encrypt the encrypted second field with the report format placeholder further includes:

hashing the report format placeholder to a hexadecimal representation; and providing the hexadecimal representation as a parameter to a post-decryption function.

\* \* \* \* \*